(12) United States Patent
Konada et al.

(10) Patent No.: US 11,987,089 B2
(45) Date of Patent: May 21, 2024

(54) ELECTRICALLY POWERED SUSPENSION SYSTEM

(71) Applicant: HONDA MOTOR CO., LTD., Tokyo (JP)

(72) Inventors: Kazuya Konada, Wako (JP); Takashi Yanagi, Wako (JP); Ryosuke Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 214 days.

(21) Appl. No.: 17/679,373

(22) Filed: Feb. 24, 2022

(65) Prior Publication Data
US 2022/0297493 A1    Sep. 22, 2022

(30) Foreign Application Priority Data

Mar. 22, 2021    (JP) .................................. 2021-047966

(51) Int. Cl.
*B60G 17/015*    (2006.01)
*B60G 17/016*    (2006.01)
*B60G 17/018*    (2006.01)

(52) U.S. Cl.
CPC ..... *B60G 17/0157* (2013.01); *B60G 17/0164* (2013.01); *B60G 17/018* (2013.01);
(Continued)

(58) Field of Classification Search
CPC ............ B60G 17/0157; B60G 17/0164; B60G 17/018; B60G 2202/422;
(Continued)

(56) References Cited

U.S. PATENT DOCUMENTS

| 4,809,179 A * | 2/1989 | Klinger .............. B60G 21/0556 |
| | | 280/5.514 |
| 5,037,119 A * | 8/1991 | Takehara ............... B62D 7/159 |
| | | 280/5.514 |

(Continued)

FOREIGN PATENT DOCUMENTS

| JP | H05-319054 A | 12/1993 |
| JP | 2010-254062 A | 11/2010 |

(Continued)

OTHER PUBLICATIONS

Japanese Office Action received in corresponding Japanese application No. 2021-047966 dated Dec. 6, 2022 with English translation (6 pages).

*Primary Examiner* — Sizo B Vilakazi
*Assistant Examiner* — Brian R Kirby
(74) *Attorney, Agent, or Firm* — Rankin, Hill & Clark LLP

(57) ABSTRACT

An electrically powered suspension system includes: an actuator that is provided between a vehicle body and a wheel of a vehicle and generates a load for damping vibration of the vehicle body; an information acquisition part that acquires information on a sprung state amount and a road surface state; a target load calculation part that calculates a first target load related to skyhook control based on the sprung state amount and calculates a second target load related to preview control based on the road surface state; and a load control part. The target load calculation part calculates a third target load related to pitch generation control based on a target pitch angle and calculates a combined target load into which the first target load, second target load, and third target load have been combined. The load control part performs load control of the actuator using the combined target load.

3 Claims, 7 Drawing Sheets

(52) U.S. Cl.
CPC ............ *B60G 2202/422* (2013.01); *B60G 2400/0512* (2013.01); *B60G 2400/0522* (2013.01); *B60G 2400/106* (2013.01); *B60G 2400/206* (2013.01); *B60G 2400/60* (2013.01); *B60G 2600/12* (2013.01)

(58) Field of Classification Search
CPC .... B60G 2400/0512; B60G 2400/0522; B60G 2400/106; B60G 2400/206; B60G 2400/60; B60G 2600/12; B60G 2400/10; B60G 2400/25; B60G 2400/33; B60G 2400/39; B60G 2401/142; B60G 2500/10; B60G 17/015; B60G 17/016; B60G 17/0165; B60G 17/0182
USPC ........................................ 701/37, 38
See application file for complete search history.

(56) References Cited

U.S. PATENT DOCUMENTS

| | | | | |
|---|---|---|---|---|
| 5,144,558 A * | 9/1992 | Fukushima | ......... | B60G 17/016 280/5.506 |
| 5,367,459 A * | 11/1994 | Shtarkman | ......... | B60G 17/018 280/93.5 |
| 5,410,482 A * | 4/1995 | Kimura | ......... | B60G 17/018 280/5.514 |
| 5,444,621 A * | 8/1995 | Matsunaga | ......... | B60G 17/0165 280/5.518 |
| 5,510,985 A * | 4/1996 | Yamaoka | ......... | B60G 17/0165 280/124.145 |
| 5,619,413 A * | 4/1997 | Oakley | ......... | B60G 17/017 280/5.514 |
| 5,701,245 A * | 12/1997 | Ogawa | ......... | B60G 17/0165 280/5.515 |
| 5,794,168 A * | 8/1998 | Sasaki | ......... | F16F 9/468 280/5.515 |
| 6,070,681 A * | 6/2000 | Catanzarite | ......... | B62D 33/0608 180/89.15 |
| 6,366,841 B1 * | 4/2002 | Ohsaku | ......... | B60G 17/0152 280/5.515 |
| 6,701,235 B2 * | 3/2004 | Uchiyama | ......... | B60G 17/01908 180/902 |
| 9,662,954 B2 * | 5/2017 | Brady | ......... | B60G 17/016 |
| 2008/0004770 A1 * | 1/2008 | Masamura | ......... | B60G 17/018 701/37 |
| 2009/0085309 A1 * | 4/2009 | Hirao | ......... | B60G 17/015 280/5.503 |
| 2010/0013174 A1 * | 1/2010 | Buma | ......... | B60G 17/018 280/5.507 |
| 2010/0138108 A1 * | 6/2010 | Kajino | ......... | B60G 17/016 701/38 |
| 2013/0197754 A1 * | 8/2013 | Lee | ......... | B60G 17/0157 701/37 |
| 2014/0125018 A1 * | 5/2014 | Brady | ......... | B60G 17/016 280/5.519 |
| 2014/0309883 A1 * | 10/2014 | Kikuchi | ......... | B60G 17/0164 701/40 |
| 2014/0336894 A1 * | 11/2014 | Kikuchi | ......... | B60W 10/184 701/70 |
| 2020/0023705 A1 * | 1/2020 | Hirao | ......... | B60G 17/0182 |
| 2021/0379956 A1 | 12/2021 | Furuta | | |

FOREIGN PATENT DOCUMENTS

| | | | | |
|---|---|---|---|---|
| JP | 2012-136111 A | 7/2012 | | |
| JP | 2016-166885 A | 9/2016 | | |
| JP | 2018-134899 A | 8/2018 | | |
| JP | 2021-192997 A | 12/2021 | | |
| WO | WO-2013111500 A1 * | 8/2013 | ......... | B60G 17/0165 |

* cited by examiner

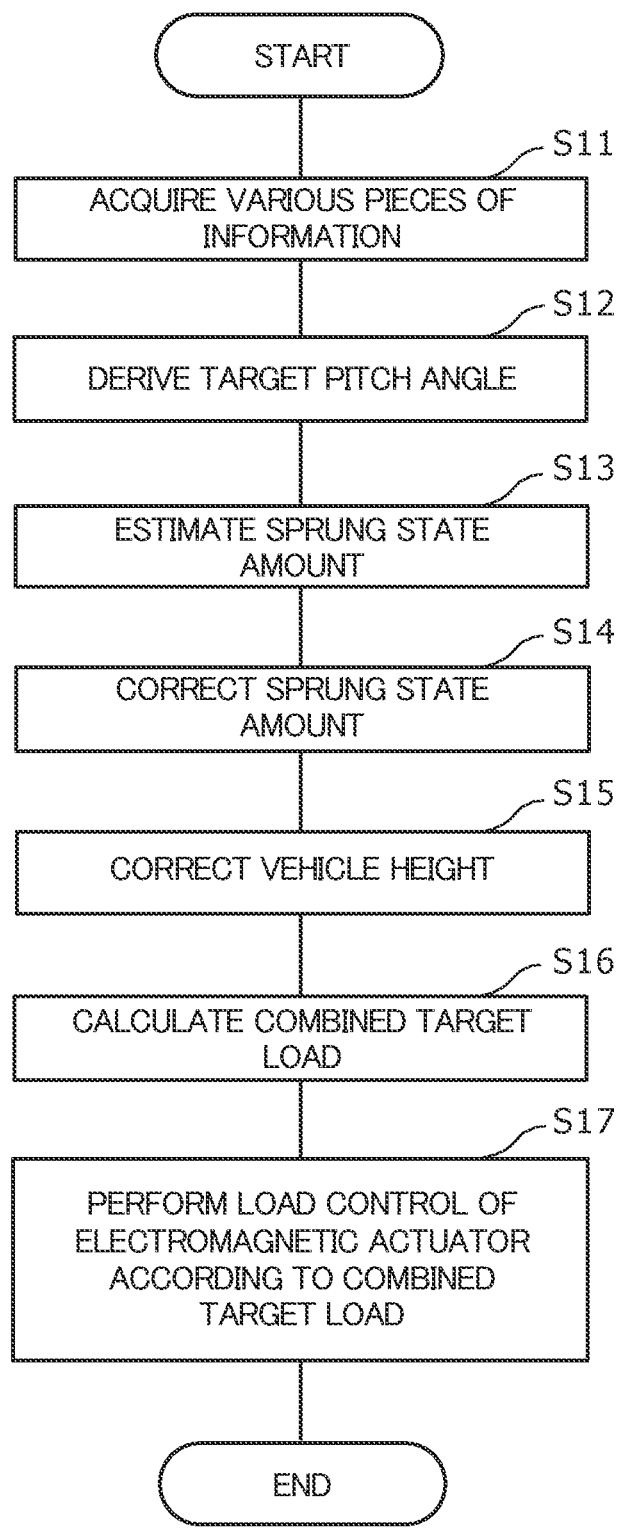

ELECTRICALLY POWERED SUSPENSION SYSTEM

CROSS-REFERENCE TO RELATED APPLICATIONS

The present application claims the foreign priority benefit under Title 35 U.S.C. § 119 of Japanese Patent Application No. 2021-047966, filed on Mar. 22, 2021, in the Japan Patent Office, the disclosure of which is herein incorporated by reference in its entirety.

BACKGROUND OF THE INVENTION

1. Field of the Invention

The present invention relates to an electrically powered suspension system including an actuator that is provided between a vehicle body and a wheel of a vehicle and configured to generate a load for damping vibration of the vehicle body.

2. Description of Related Art

An electrically powered suspension system including an actuator provided between a vehicle body and a wheel of a vehicle and configured to generate a load for damping vibration of the vehicle body is conventionally known. For example, see Japanese Patent Publication No. 2018-134899 (hereinafter referred to as Patent Literature 1).

The electrically powered suspension system described in Patent Literature 1 includes, in a system through which influence of an input of a disturbance is outputted with a delay, a control device that controls a control target that is capable of controlling the output. The control device generates a control instruction that cancels the influence of the disturbance on the basis of: a transfer function from the input of the disturbance to the output of the system; a transfer function from a control instruction to the output, the control instruction being to be issued to the control target controlling the output of the system; and information on the disturbance inputted to the system.

According to the electrically powered suspension system described in Patent Literature 1, the control device operates so as to cancel the vibration of the vehicle body caused by a road surface input, thereby to reduce the vibration of the vehicle body.

Incidentally, in sporty driving a front-wheel drive vehicle, there is a demand for quickly switching the advancing direction of the vehicle by utilizing the tack-in phenomenon (known as a power-off reaction of the vehicle in a turn, which causes the vehicle to head sharply toward the direction of the turn) due to the pitching behavior (nosediving behavior) that is generated in a brake operation of the vehicle.

However, the electrically powered suspension system described in Patent Literature 1 operates such that the control device restrains, regardless of whether sporty driving is being performed, the pitching behavior (nosediving behavior) that normally occurs when braking the vehicle. Then, in sporty driving a front-wheel drive vehicle, it is not possible to quickly switch the advancing direction of the vehicle by utilizing the tack-in phenomenon. Therefore, the sense of unity of human and automobile in sporty driving is decreased. As a result, there is a risk that the driver may feel uncomfortable.

SUMMARY OF INVENTION

In view of the above-described situation, an object of the present invention is to provide an electrically powered suspension system that is capable of producing a good ride quality with a sense of unity of human and automobile even when performing a brake operation in sporty driving.

To achieve the object, an electrically powered suspension system according to a first aspect of the present invention includes: an actuator provided between a vehicle body and a wheel of a vehicle and configured to generate a load for damping vibration of the vehicle body; an information acquisition part configured to acquire information on a sprung state amount of the vehicle and information on a road surface state of a road on which the vehicle is traveling; a target load calculation part configured to calculate a first target load related to skyhook control based on the sprung state amount and to calculate a second target load related to preview control based on the road surface state of the road on which the vehicle is traveling; and a load control part configured to perform load control of the actuator using the calculation results of the target load calculation part. The information acquisition part is further configured to acquire information related to longitudinal acceleration and deceleration of the vehicle. The electrically powered suspension system further includes a target pitch angle derivation part configured to derive a target pitch angle of the vehicle on the basis of the information related to the longitudinal acceleration and the deceleration of the vehicle. The target load calculation part is further configured to calculate a third target load related to pitch generation control based on the target pitch angle derived by the target pitch angle derivation part and to calculate a combined target load into which the first target load, the second target load, and the third target load have been combined. The load control part performs load control of the actuator using the combined target load.

The present invention makes it possible to produce a good ride quality with a sense of unity of human and automobile even when performing a brake operation in sporty driving.

BRIEF DESCRIPTION OF THE DRAWINGS

FIG. 6 is a flowchart for explaining operations of the electrically powered suspension system according to the embodiment of the present invention.

DETAILED DESCRIPTION OF THE EMBODIMENTS

Figure 1:
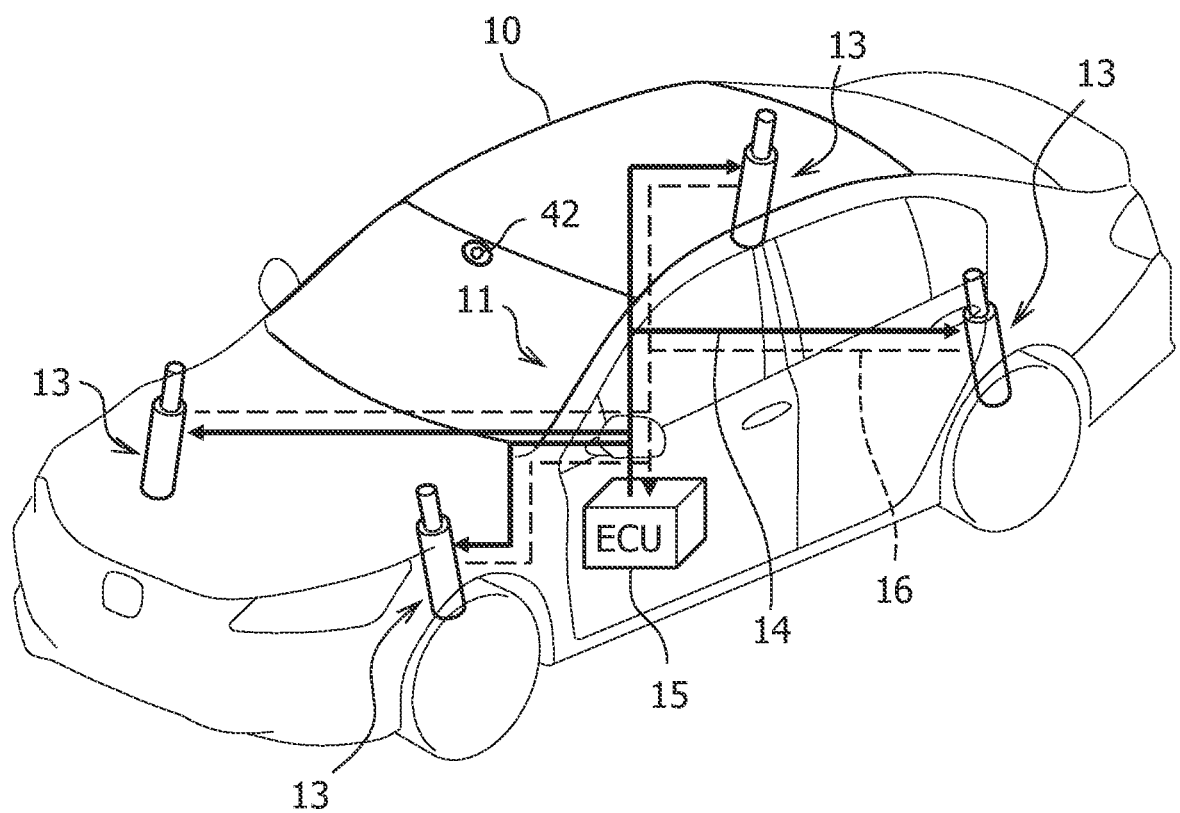
FIG. 1 is a view illustrating an entire configuration of an electrically powered suspension system according to an embodiment of the present invention.

An electrically powered suspension system 11 according to an embodiment of the present invention will be described in detail below with reference to the drawings as appropriate.

Note that, in the drawings referenced hereinafter, basically, members having the same function are denoted by the same reference sign. In this case, as a general rule, a redundant description will be omitted. For convenience of explanation, sizes and shapes of components may be schematically illustrated with deformation or in an exaggerated manner.

[Basic Configuration Common to Electrically Powered Suspension Systems 11 According to Embodiments of the Present Invention]

Firstly, a description will be given of a basic configuration common to the electrically powered suspension systems 11 according to the embodiments of the present invention with reference to FIGS. 1 and 2.

FIG. 1 is a view illustrating an entire configuration common to the electrically powered suspension systems 11 according to the embodiments of the present invention. FIG. 2 is a partial cross-sectional view of an electromagnetic actuator 13 included in the electrically powered suspension system 11.

As illustrated in FIG. 1, the electrically powered suspension system 11 according to the embodiment of the present invention includes a plurality of electromagnetic actuators 13 respectively provided to the wheels of a vehicle 10, and a load control ECU 15. The plurality of electromagnetic actuators 13 and the load control ECU 15 are connected to each other with respective electric power supply lines 14 (see the solid lines in FIG. 1), through which load control electric power is supplied from the load control ECU 15 to the plurality of electromagnetic actuators 13, and with respective signal lines 16 (see the broken lines in FIG. 1), through which load control signals of electric motors 31 (see FIG. 2) are fed from the plurality of electromagnetic actuators 13 to the load control ECU 15.

In the present embodiment, a total of four electromagnetic actuators 13 are provided respectively to the front wheels (front left wheel and front right wheel) and the rear wheels (rear left wheel and rear right wheel). The electromagnetic actuators 13 provided respectively to the wheels are each separately controlled to damp vibration in conjunction with expansion/contraction operations for the corresponding wheel.

In the embodiment of the present invention, unless otherwise noted, the plurality of electromagnetic actuators 13 each have a common configuration. As such, the configuration of one electromagnetic actuator 13 will be described below as a representative of the plurality of electromagnetic actuators 13.

Figure 2:
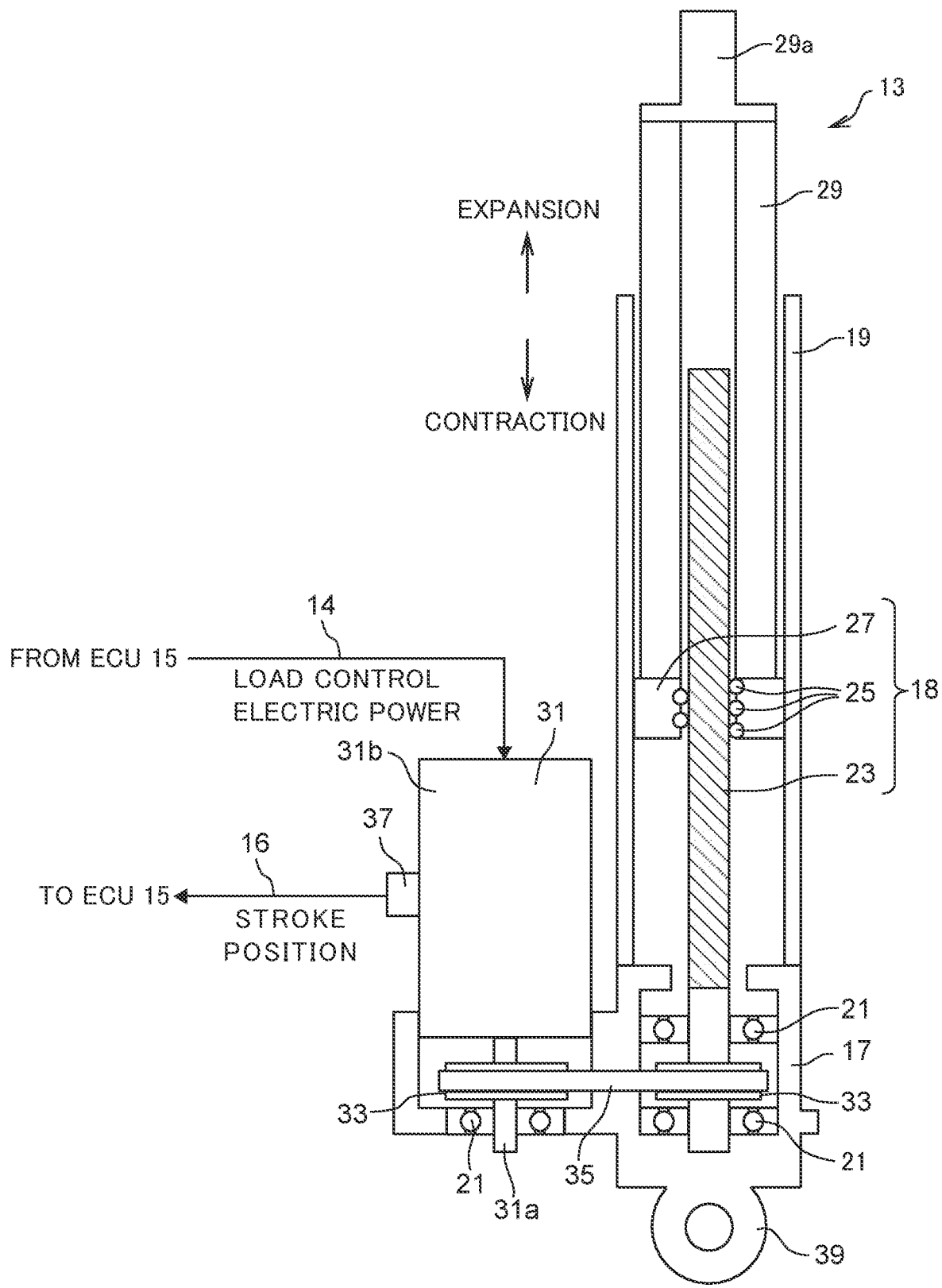
FIG. 2 is a partial cross-sectional view of an electromagnetic actuator included in the electrically powered suspension system according to the embodiment of the present invention.

As illustrated in FIG. 2, the electromagnetic actuator 13 includes a base housing 17, an outer tube 19, a ball bearing 21, a ball screw shaft 23, a plurality of balls 25, a nut 27, and an inner tube 29.

The base housing 17 supports a proximal end side of the ball screw shaft 23 via the ball bearing 21 such that the ball screw shaft 23 is rotatable about its axis. The outer tube 19 is provided on the base housing 17 and accommodates a ball screw mechanism 18 including the ball screw shaft 23, the plurality of balls 25, and the nut 27. The plurality of balls 25 roll along a screw groove of the ball screw shaft 23. The nut 27 is engaged with the ball screw shaft 23 via the plurality of balls 25 and converts a rotational motion of the ball screw shaft 23 into a linear motion. The inner tube 29, which is coupled to the nut 27, moves along the axial directions of the outer tube 19 together with the nut 27.

In order to transmit a rotational driving force to the ball screw shaft 23, the electromagnetic actuator 13 includes the electric motor 31, a pair of pulleys 33, and a belt member 35, as illustrated in FIG. 2. The electric motor 31 is provided on the base housing 17 in parallel to the outer tube 19. The pulleys 33 are respectively attached to a motor shaft 31a of the electric motor 31 and the ball screw shaft 23. The belt member 35, which is for transmitting the rotational driving force of the electric motor 31 to the ball screw shaft 23, is wrapped around the pair of pulleys 33.

The electric motor 31 is provided with a resolver 37 that detects a rotation angle signal of the electric motor 31. The rotation angle signal of the electric motor 31, detected by the resolver 37, is fed to the load control ECU 15 via the signal line 16. The rotational driving of the electric motor 31 is controlled in accordance with the load control electric power which is supplied by the load control ECU 15 to the corresponding one of the plurality of electromagnetic actuators 13 via the electric power supply line 14.

As illustrated in FIG. 2, the present embodiment employs a layout in which the motor shaft 31a of the electric motor 31 and the ball screw shaft 23 are arranged substantially in parallel and connected with each other, thereby shortening the axial dimension of the electromagnetic actuator 13. Alternatively, another layout may be employed in which, for example, the motor shaft 31a of the electric motor 31 and the ball screw shaft 23 are coaxially arranged and connected to each other.

As illustrated in FIG. 2, the electromagnetic actuator 13 according to this embodiment of the present invention has a connecting portion 39 provided at a lower end of the base housing 17. The connecting portion 39 is connected and fixed to an unsprung member 81, non-limiting examples of which unsprung member 81 include a lower arm and a knuckle on the wheel side (see FIG. 5A). On the other hand, an upper end portion 29a of the inner tube 29 is connected and fixed to a sprung member 83, non-limiting examples of which sprung member 83 include a strut tower portion on the vehicle body side (see FIG. 5A).

In short, the electromagnetic actuator 13 is arranged in parallel with a spring member (suspension) 85 (see FIG. 5A) provided between the sprung member (vehicle body) 83 of the vehicle 10 and the unsprung member (e.g., a wheel to which a tire is attached; hereinafter, sometimes generally called "wheel and the like") 81 of the vehicle 10. The electromagnetic actuator 13 serves as a virtual damper 87 (see FIG. 5A) that buffers the expansion/contraction force of the spring member (suspension) 85.

The unsprung members (wheels and the like) 81 respectively provided to right and left wheels are connected with each other via a not-shown stabilizer.

A spring component 91 and a damper component 93 are interposed between the unsprung member (wheel and the like) 81 of the vehicle 10 and the road surface. In short, the tire attached to the wheel of the vehicle 10 functions as the spring component 91 and the damper component 93.

The electromagnetic actuator 13 configured as described above operates as follows. Specifically, consider a case where, for example, a thrust related to upward vibration is inputted into the connecting portion 39 from the wheel side of the vehicle 10. In such a case, the inner tube 29 and the nut 27 attempt to descend together with respect to the outer tube 19, to which the thrust relating to the upward vibration has been applied. In response to this, the ball screw shaft 23 attempts to rotate in a direction to follow the descending of the nut 27. In this event, the electric motor 31 is caused to generate a rotational driving force in a direction in which the rotational driving force impedes the descending of the nut 27. This rotational driving force of the electric motor 31 is transmitted to the ball screw shaft 23 via the belt member 35.

In this manner, the electromagnetic actuator 13 exerts a reaction force (attenuation force) on the ball screw shaft 23 against the thrust related to the upward vibration, thereby to attenuate the vibration being to be transmitted from the wheel side to the vehicle body side.

[Internal Configuration of load control ECU 15]

Next, a description will be given of internal and peripheral configurations of the load control ECU 15 included in the electrically powered suspension system 11 according to the embodiment of the present invention, with reference to FIG. 3.

Figure 3:
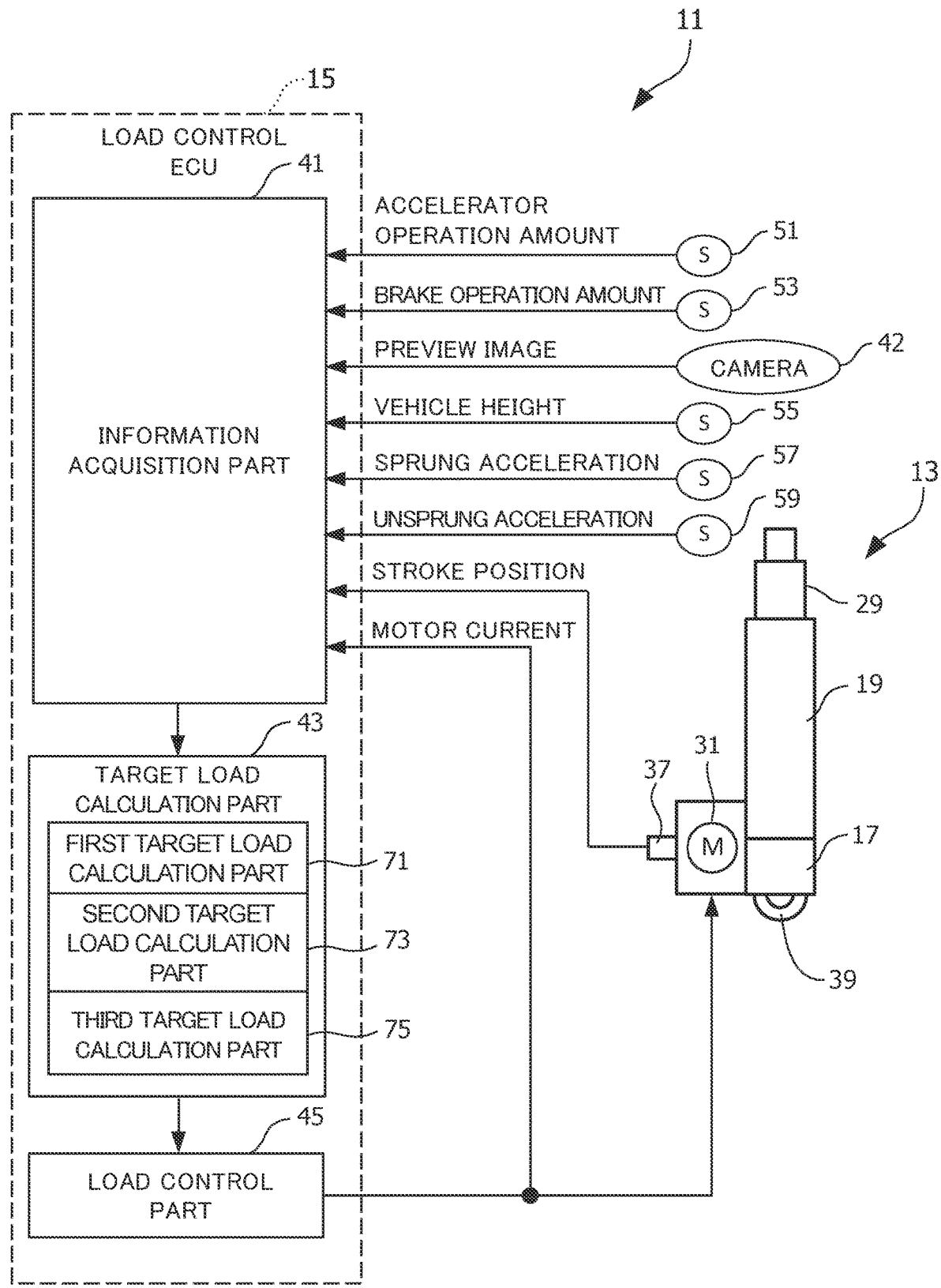
FIG. 3 is a block diagram illustrating internal and peripheral parts of a load control ECU (Electronic Control Unit) included in the electrically powered suspension system according to the embodiment of the present invention.

FIG. 3 is a block diagram illustrating internal and peripheral parts of the load control ECU 15 included in the electrically powered suspension system 11 according to the embodiment of the present invention.

[Electrically Powered Suspension System 11 According to Embodiment of the Present Invention]

The load control ECU 15 included in the electrically powered suspension system 11 according to the embodiment of the present invention includes a microcomputer that performs various arithmetic processing operations. The load control ECU 15 performs load control on each of the plurality of electromagnetic actuators 13 on the basis of the rotation angle signal including information on the stroke position of the electric motor 31, detected by the resolver 37, a combined target load (details described below), a motor current to be applied to the electric motor 31, and the like. With this, the load control ECU 15 has a load control function that generates a load for an attenuation operation or an expansion/contraction operation of the electromagnetic actuator 13.

In order to implement such a load control function, the load control ECU 15 includes an information acquisition part 41, a target load calculation part 43, and a load control part 45, as illustrated in FIG. 3.

As illustrated in FIG. 3, the information acquisition part 41 acquires time-series information on each of an accelerator operation amount and a brake operation amount. The information on the accelerator operation amount may be acquired through an accelerator sensor 51 that detects an amount of pressing down the accelerator pedal (not shown) of the vehicle 10. The information on the brake operation amount may be acquired through a brake sensor 53 that detects an amount of pressing down the brake pedal (not shown) of the vehicle 10. The information acquisition part 41 may consult, in place of or in addition to the information on the brake operation amount, information on the pressure of brake fluid acting on the brake system. In this case, information on the pressure of brake fluid may be acquired through a fluid pressure sensor that detects the pressure of brake fluid acting on the brake system.

The information acquisition part 41 also acquires, as time-series information on a road surface state of a road which is located in the advancing direction of the vehicle 10 and on which the vehicle 10 is traveling, information on a preview image and information on a vehicle height. The information on the preview image may be acquired through, in addition to a camera 42 provided on the vehicle 10, external world sensors such as a radar and a LIDAR system. The information on the vehicle height may be acquired, for example, through a vehicle height sensor 55 that detects the vehicle height of the vehicle 10.

The information acquisition part 41 further acquires time-series information on a sprung acceleration and time-series information on an unsprung acceleration. The time-series information on the sprung acceleration may be acquired on the basis of detection values of a sprung acceleration sensor 57 provided on the sprung member (vehicle body) 83 of the vehicle 10. The time-series information on the unsprung acceleration may be acquired on the basis of detection values of an unsprung acceleration sensor 59 provided on the unsprung member (wheel and the like) 81 of the vehicle 10.

The pieces of information on the accelerator operation amount, the brake operation amount, the preview image, the vehicle height, the sprung acceleration, the unsprung acceleration, the stroke position of the electromagnetic actuator 13, and the motor current for the electric motor 31, acquired by the information acquisition part 41, are fed to the target load calculation part 43.

As illustrated in FIG. 3, the target load calculation part 43 has a function of figuring out a combined target load, which is a target value for an attenuation operation or expansion/contraction operation of the electromagnetic actuator 13, by calculation using the various pieces of information acquired by the information acquisition part 41.

The target load calculation part 43 includes a first target load calculation part 71 configured to calculate a first target load for skyhook control, a second target load calculation part 73 configured to calculate a second target load for preview control, and a third target load calculation part 75 configured to calculate a third target load for pitch generation control. The configurations of the first target load calculation part 71, the second target load calculation part 73, and the third target load calculation part 75 will be described in detail later.

The load control part 45 calculates a target current value that can produce the combined target load figured out by the target load calculation part 43. The load control part 45 then performs drive control on the electric motor 31 included in each of the plurality of electromagnetic actuators 13 so that the motor current for the electric motor 31 will follow the target current value calculated. The plurality of electromagnetic actuators 13 are controlled separately to perform load control with respective electric motors 31.

[Configuration of Main Part of Load Control ECU 15 Included in Electrically Powered Suspension System 11]

Next, a description will be given of an internal configuration of the load control ECU 15 included in the electrically powered suspension system 11 according to the embodiment of the present invention, with reference to FIGS. 4, 5A, and 5B as appropriate.

Figure 4:
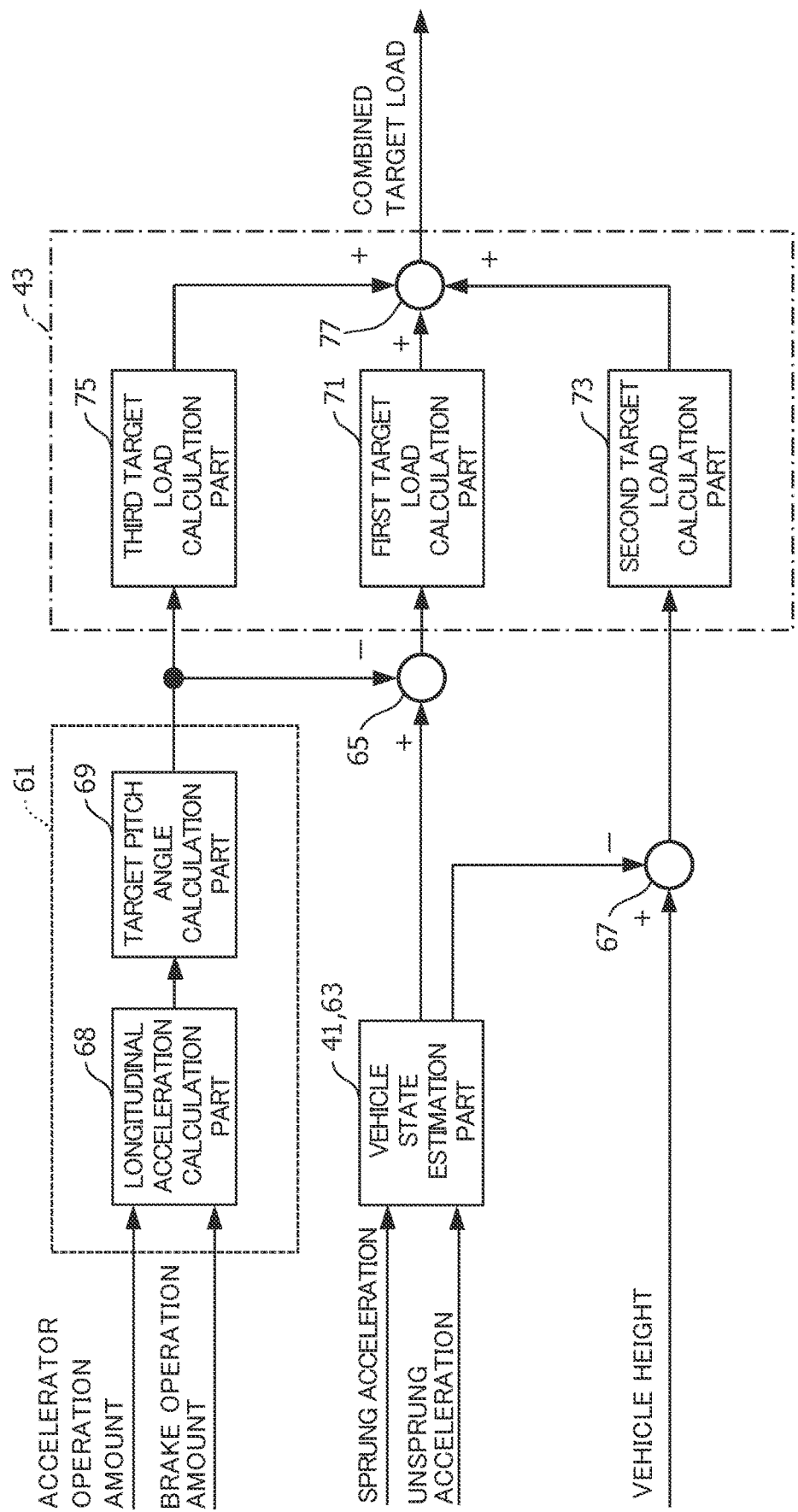
FIG. 4 is a block diagram conceptually illustrating an internal configuration of the load control ECU included in the electrically powered suspension system according to the embodiment of the present invention.

FIG. 4 is a block diagram conceptually illustrating an internal configuration of the load control ECU 15 included in the electrically powered suspension system 11 according to the embodiment of the present invention. FIGS. 5A and 5B are each a conceptual diagram for explaining operations of the electrically powered suspension system 11.

As illustrated in FIG. 4, the load control ECU 15 included the electrically powered suspension system 11 includes: a target pitch angle derivation part 61, a vehicle state estimation part 63, a first subtractor part 65, a second subtractor part 67, the first target load calculation part 71, the second target load calculation part 73, the third target load calculation part 75, and a combiner part 77. The vehicle state estimation part 63 also serves as the information acquisition part 41. The first target load calculation part 71, the second target load calculation part 73, and the third target load calculation part 75 are included in the target load calculation part 43.

The target pitch angle derivation part 61 includes a longitudinal acceleration calculation part 68 and a target pitch angle calculation part 69.

Figure 5A:
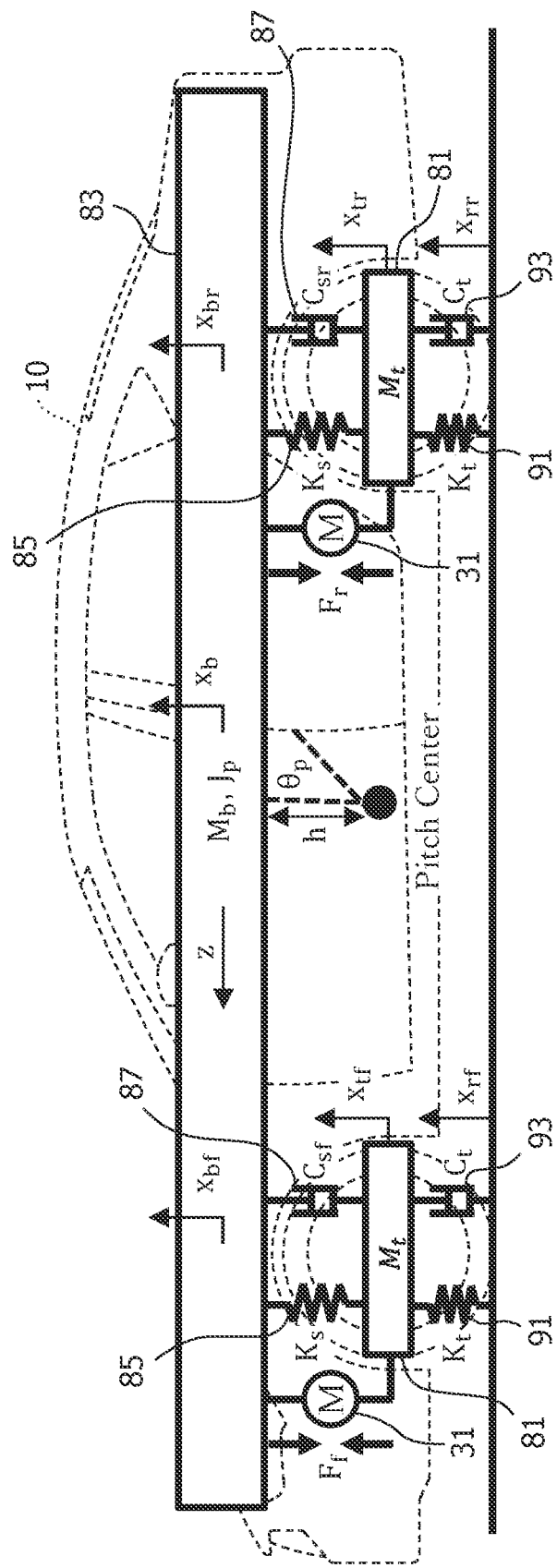
FIG. 5A is a conceptual diagram for explaining operations of the electrically powered suspension system according to the embodiment of the present invention.

The target pitch angle derivation part 61 derives a target pitch angle using an equation of motion of a pitch action (see formula (1)), which equation of motion includes the damping coefficient Cs of the virtual dampers 87 of the electromagnetic actuators 13 provided respectively to the four wheels of the vehicle 10 (see FIG. 5A). Note that the damping coefficients set to the virtual dampers 87 are assumed to be the same for the sake of convenience.

$$J_p \ddot{\theta}_p + \frac{W_b}{2}\{C_s(\dot{x}_{bf} - \dot{x}_{tf}) + K_s(x_{bf} - x_{tf})\} - \frac{W_b}{2}\{C_s(\dot{x}_{br} - \dot{x}_{tr}) + K_s(x_{bf} - x_{tf})\} + M_b \ddot{z}h = 0 \; (\cos\theta_p \approx 1) \quad (1)$$

In formula (1), $J_p$ represents the pitch moment of inertia of the sprung member (vehicle body) 83; $M_b$ represents the mass of the vehicle body 83; $W_b$ represents the half length of the tread distance of the vehicle 10; $K_s$ represents the spring constant of the spring member (suspension) 85, where the suspension spring constants of the four wheels are assumed to have the same value; $\theta_p$ represents the pitch angle of the vehicle body 83 ($\ddot{\theta}_p$ represents the pitch angle acceleration of the vehicle body 83); z represents the longitudinal shift of the vehicle body 83 ($\ddot{z}$ represents the longitudinal acceleration of the vehicle body 83); h represents the distance from the pitch center to the center of gravity of the vehicle body 83; $x_t$ ($x_{tf}$, $x_{tr}$) represents the vertical shift (unsprung shift) of the unsprung member (wheel and the like) 81, where $x_{tf}$ represents the vertical shift on the front side and $x_{tr}$ represents the vertical shift of the rear side (hereinafter, the notations with postfixes f and r are used in the same manner); and $x_b$ ($x_{bf}$, $x_{br}$) represents the vertical shift (vehicle body shift) of the vehicle body 83.

In FIG. 5A, $M_t$ represents the mass of wheel and the like 81; $x_r$ ($x_{rf}$, $x_{rr}$) represents the road surface height input; $K_t$ represents the spring constant of the unsprung member (tire) 81 (the tires of the four wheels are assumed to have the same spring constant); $C_t$ represents the damping constant of the unsprung member (tire) 81 (the tires of the four wheels are assumed to have a common damping coefficient value); and $F_f$ represents the thrust (load) of the front electromagnetic actuator 13 and $F_r$ represents the thrust (load) of the rear electromagnetic actuator 13.

Front side vehicle body shift $x_{bf}$, front side vehicle body speed $\dot{x}_{bf}$, rear side vehicle body shift $x_{br}$, rear side vehicle body speed $\dot{x}_{br}$ can each be expressed using vehicle body shift $x_b$, vehicle body speed $\dot{x}_b$, pitch angle $\theta_p$, and pitch angle speed $\dot{\theta}_p$ as formula (2).

$$\begin{aligned} x_{bf} &= x_b + \frac{W_b}{2}\sin\theta_p = x_b + \frac{W_b}{2}\theta_p \\ \dot{x}_{bf} &= \dot{x}_b + \frac{W_b}{2}\dot{\theta}_p \\ x_{bf} &= x_b - \frac{W_b}{2}\sin\theta_p = x_b - \frac{W_b}{2}\theta_p \\ \dot{x}_{bf} &= \dot{x}_b - \frac{W_b}{2}\dot{\theta}_p \end{aligned} \quad (2)$$

By substituting formula (2) to formula (1), the equation of motion describing the pitch action, represented by formula (1), is rewritten into the form represented by the following formula (3).

$$J_p \ddot{\theta}_p + \frac{W_b}{2}\left\{C_s\left(\dot{x}_b + \frac{W_b}{2}\dot{\theta}_p - \dot{x}_{tf}\right) + K_s\left(x_b + \frac{W_b}{2}\theta_p - x_{tf}\right)\right\} - \frac{W_b}{2}\left\{C_s\left(\dot{x}_b - \frac{W_b}{2}\dot{\theta}_p - \dot{x}_{tr}\right) + K_s\left(x_b - \frac{W_b}{2}\theta_p - x_{tr}\right)\right\} + M_b \ddot{z}h = 0 \quad (3)$$

The longitudinal acceleration calculation part 68 calculates the longitudinal acceleration $\ddot{z}$ of the vehicle body on the basis of the time-series information on each of the accelerator operation amount and the brake operation amount of the vehicle 10, acquired by the information acquisition part 41. The calculation of the longitudinal acceleration $\ddot{z}$ of the vehicle body may be performed, for example, with reference to the vehicle speed, an inclination angle of the road surface (ascending road, descending road, or flat road), and an engine torque.

The vehicle body longitudinal acceleration $\ddot{z}$ calculated by the longitudinal acceleration calculation part 68 is fed to the target pitch angle calculation part 69.

The target pitch angle calculation part 69 calculates a target pitch angle $\theta_p$ on the basis of the vehicle body longitudinal acceleration $\ddot{z}$ calculated by the longitudinal acceleration calculation part 68.

Specifically, a Laplace transform is applied to the equation of motion of the pitch action, represented by formula (3).

The resultant equation of motion of the pitch action, to which Laplace transformation has been applied, is as the following formula (4):

$$J_p \Theta_p s^2 + \frac{W_b}{2}\left\{C_s\left(X_b + \frac{W_b}{2}\Theta_p - X_{tf}\right)s + K_s\left(X_b + \frac{W_b}{2}\Theta_p - X_{tf}\right)\right\} - \frac{W_b}{2}\left\{C_s\left(X_b - \frac{W_b}{2}\Theta_p - X_{tr}\right)s + K_s\left(X_b - \frac{W_b}{2}\Theta - X_{tr}\right)\right\} + M_b Zhs^2 = 0 \quad (4)$$

In formula (4), s denotes a Laplace operator.

Next, for the sake of convenience, road surface height input $x_r$ ($x_{rf}$, $x_{rr}$) is assumed to be zero (i.e., the road surface is assumed to have no irregularities) and the vertical shift $x_t$ ($x_{tf}$, $x_{tr}$) of the unsprung member (wheel and the like) 81 is assumed to be zero. Substitution of these assumed values into formula (4) yields the following formula (5) representing the target pitch angle $\theta_p$ of the vehicle body. Note that the vertical shift $x_t$ is assumed to be zero for the sake of convenience because the equation of motion used herein assumes a situation where no road surface input is present. If an equation of motion assuming a road surface input is used, appropriate non-zero values are to be set as a road surface variation.

$$\Theta_p = \frac{-M_b s^2}{J_b s^2 + \frac{W_b^2}{2}(C_s s + K_s)} Z \quad (5)$$

Formula (5) shows that the target pitch angle $\theta_p$ is represented as a function of the longitudinal shift z.

The information on the target pitch angle $\theta_p$ of the vehicle body, calculated by the target pitch angle calculation part 69, is fed to the first subtractor part 65 and the third target load calculation part 75.

The vehicle state estimation part 63 estimates, for example, as current vehicle state amounts, a sprung speed as first vehicle state amount (sprung state amount) and a time integral of the sprung speed as second vehicle state amount, on the basis of the time-series information on the sprung acceleration and unsprung acceleration acquired by the information acquisition part 41.

The first vehicle state amount (sprung speed) and the second vehicle state amount (time integral of the sprung speed) estimated by the vehicle state estimation part 63 are respectively fed to the first subtractor part 65 and the second subtractor part 67.

The first subtractor part 65 subtracts the target pitch angle speed $\dot{\theta}_p$ of the vehicle 10, calculated by the target pitch angle calculation part 69, from the current first vehicle state amount (sprung speed) estimated by the vehicle state estimation part 63. In this way, the first vehicle state amount (sprung speed) is corrected by removing the pitch angle speed component from the current first vehicle state amount (sprung speed). The first subtractor part 65 corresponds to the "sprung state amount correction part" of the present invention.

The first vehicle state amount (sprung speed) having been corrected by the first subtractor part 65 is fed to the first target load calculation part 71.

The second subtractor part 67 subtracts the current second vehicle state amount (time integral of the sprung speed), estimated by the vehicle state estimation part 63, from the current vehicle height acquired by the information acquisition part 41. In this way, the vehicle height is corrected by removing a vehicle height component originating in the variation of the sprung speed from the current vehicle height.

The vehicle height corrected by the second subtractor part 67 is fed to the second target load calculation part 73.

The first target load calculation part 71 calculates a first target load related to skyhook control, on the basis of the first vehicle state amount (sprung speed) corrected by the first subtractor part 65. Specifically, for example, the first target load calculation part 71, using a control rule based on the skyhook theory, multiplies the corrected first vehicle state amount (sprung speed) by a skyhook damping coefficient to calculate the first target load.

The first target load calculated by the first target load calculation part 71 is fed to combiner part 77.

The second target load calculation part 73 calculates a second target load related to preview control, on the basis of the vehicle height corrected by the second subtractor part 67 (on the basis of an actual height from the road surface). Specifically, for example, the second target load calculation part 73 multiplies, using a control rule based on the skyhook theory, the corrected vehicle height (actual height from the road surface) by a preview control gain to calculate the second target load.

The second target load calculated by the second target load calculation part 73 is fed to combiner part 77.

The third target load calculation part 75 calculates a third target load ($F_f, F_r$) on the basis of the information on the target pitch angle $\theta_p$ of the vehicle 10 calculated by the target pitch angle calculation part 69.

Specifically, the third target load ($F_f, F_r$), related to pitch generation control that causes the calculated target pitch angle $\theta_p$ to occur, may be calculated in accordance with the following procedure.

Figure 5B:
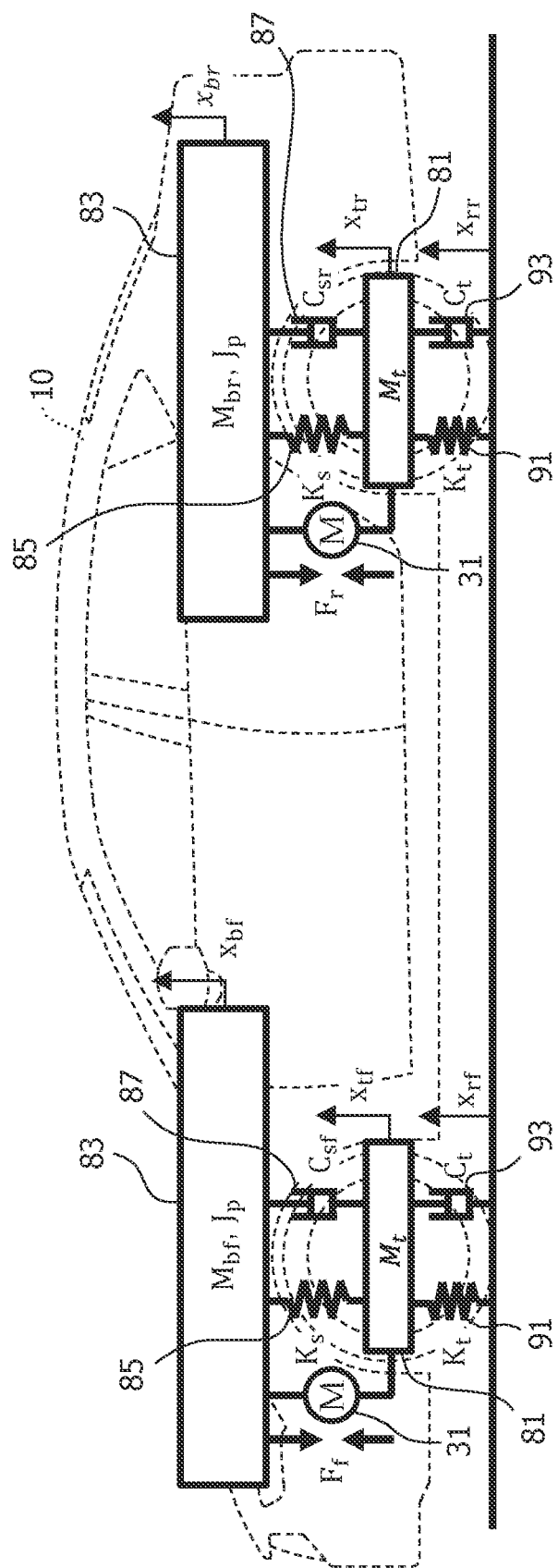
FIG. 5B is a conceptual diagram for explaining operations of the electrically powered suspension system according to the embodiment of the present invention.

First, the one-wheel model illustrated in FIG. 5B is assumed as the vehicle model, and an equation of motion of the vehicle body, based on the model, is solved by calculation. The equation of motion of the vehicle body may be represented by the following formula (6). Note that instead of assuming the one-wheel model illustrated in FIG. 5B as the vehicle model, the thrusts may be directly calculated on the basis of the model illustrated in FIG. 5A.

$$f_f = M_{bf}\ddot{x}_{bf} + C_s(\dot{x}_{bf} - \dot{x}_{tf}) + K_s(x_{bf} - x_{tf})$$

$$f_r = M_{br}\ddot{x}_{br} + C_s(\dot{x}_{br} - \dot{x}_{tr}) + K_s(x_{br} - x_{tr}) \qquad (6)$$

Next, a Laplace transformation is applied to the equation of motion of the vehicle body represented by formula (6). The equation of motion of the vehicle body to which the Laplace transformation is applied is as the following formula (7).

$$F_f = M_{bf}X_{bf}s^2 + C_s(X_{bf} - X_{tf})s + K_s(X_{bf} - X_{tf})$$

$$F_r = M_{br}X_{br}s^2 + C_s(X_{br} - X_{tr})s + K_s(X_{br} - X_{tr}) \qquad (7)$$

In formula (7), s denotes a Laplace operator.

Next, for the sake of convenience, road surface height input $x_r$ ($x_{rf}, x_{rr}$) is assumed to be zero (i.e., the road surface is assumed to have no irregularities) and the vertical shift $x_t$ ($x_{tf}, x_{tr}$) of the unsprung member (wheel and the like) 81 is assumed to be zero. These assumed values and formula (2) are substituted into formula (7). Then, formula (7), the equation of motion of the vehicle body to which the Laplace transformation has been applied, is converted into the following formula (8).

$$F_f = \frac{W_b}{2}\{M_{bf}s^2 + C_s s + K_s\}\Theta_p \qquad (8)$$

$$F_r = -\frac{W_b}{2}\{M_{br}s^2 + C_s s + K_s\}\Theta_p$$

The third target load calculation part 75 calculates the third target load ($F_f, F_r$), which relates to pitch generation control for causing the target pitch angle $\theta_p$ to occur, in accordance with formula (8).

The third target load ($F_f, F_r$) calculated by the third target load calculation part 75 is fed to combiner part 77.

The combiner part 77 combines, by addition: the first target load calculated by the first target load calculation part 71, the second target load calculated by the second target load calculation part 73, and the third target load calculated by the third target load calculation part 75, and outputs the result of combining as a combined target load.

The combined target load combined by the combiner part 77 is fed to the load control part 45.

[Operation of Electrically Powered Suspension System 11]

Next, a description will be given of the operations of the electrically powered suspension system 11 according to the embodiment of the present invention with reference to FIG. 6. FIG. 6 is a flowchart for explaining operations of the electrically powered suspension system 11 according to the embodiment of the present invention.

In Step S11 illustrated in FIG. 6, the information acquisition part 41 of the load control ECU 15 acquires pieces of information including information on the accelerator operation amount, the brake operation amount, the preview image, the vehicle height, the sprung acceleration, and the unsprung acceleration, of the vehicle 10.

In Step S12, the target pitch angle derivation part 61 of the load control ECU 15 derives the target pitch angle $\theta_p$ of the vehicle 10.

In detail, the longitudinal acceleration calculation part 68 included in the target pitch angle derivation part 61 calculates the longitudinal acceleration z̈ of the vehicle 10 on the basis of the accelerator operation amount and the brake operation amount of the vehicle 10 acquired by the information acquisition part 41.

Next, the target pitch angle calculation part 69 included in the target pitch angle derivation part 61 calculates the target pitch angle $\theta_p$ of the vehicle 10 on the basis of the longitudinal acceleration z̈ calculated by the longitudinal acceleration calculation part 68.

In Step S13, the vehicle state estimation part 63 included in the load control ECU 15 estimates a current sprung state amount (first vehicle state amount: sprung speed) on the basis of the time-series information on the sprung acceleration and unsprung acceleration acquired by the information acquisition part 41.

In Step S14, the first subtractor part 65 included in the load control ECU 15 subtracts the target pitch angle speed $\dot{\theta}_p$ of the vehicle 10, calculated by the target pitch angle calculation part 69, from the current first vehicle state amount (sprung speed), estimated by the vehicle state estimation part 63. In this way, the first vehicle state amount (sprung speed) is corrected by removing the pitch angle speed component from the current first vehicle state amount (sprung speed).

In Step S15, the second subtractor part 67 included in the load control ECU 15 subtracts the current second vehicle state amount (time integral of the sprung speed), estimated by the vehicle state estimation part 63, from the current vehicle height acquired by the information acquisition part 41. In this way, the vehicle height is corrected by removing a vehicle height component originating in the variation of the sprung speed from the current vehicle height.

In Step S16, the target load calculation part 43 included in the load control ECU 15 calculates the combined target load.

Specifically, the first target load calculation part 71 calculates a first target load related to skyhook control, on the basis of the first vehicle state amount (sprung speed) corrected by the first subtractor part 65. The first target load calculated by the first target load calculation part 71 is a load to reduce vibration that cannot be reduced by the second target load related to the next-described preview control (e.g., vibration due to a factor other than the road surface input).

The second target load calculation part 73 calculates a second target load related to preview control, on the basis of the vehicle height corrected by the second subtractor part 67 (actual height from the road surface). The second target load calculated by the second target load calculation part 73 is a load to reduce a vibration due to a road surface input.

The third target load calculation part 75 calculates a third target load ($F_f, F_r$) on the basis of the information on the target pitch angle $\theta_p$ of the vehicle 10, calculated by the target pitch angle calculation part 69. The third target load calculated by the third target load calculation part 75 is a load to cause the target pitch angle $\theta_p$ of the vehicle 10 to occur.

The combiner part 77 combines, by addition: the first target load calculated by the first target load calculation part 71, the second target load calculated by the second target load calculation part 73, and the third target load calculated by the third target load calculation part 75, and outputs the result of combining as a combined target load.

In Step S17, the load control part 45 included in the load control ECU 15 performs load control of the electromagnetic actuator 13 according to the combined target load, which is the calculation result out of Step S16. After that, the load control ECU 15 completes one cycle of the processes.

[Advantageous Effects of Electrically Powered Suspension System 11 According to Embodiment of Present Invention]

An electrically powered suspension system 11 according to a first aspect includes: an actuator (electromagnetic actuator 13) provided between a vehicle body and a wheel of a vehicle 10 and configured to generate a load for damping vibration of the vehicle body; an information acquisition part 41 configured to acquire information on a sprung state amount related to a sprung part (vehicle body) of the vehicle 10 and information on a road surface state of a road on which the vehicle 10 is traveling; a target load calculation part 43 configured to calculate a first target load related to skyhook control based on a sprung state amount and to calculate a second target load related to preview control based on the road surface state of the road on which the vehicle 10 is traveling. a load control part 45 configured to perform load control of the electromagnetic actuator 13 using the calculation result of the target load calculation part 43.

The information acquisition part 41 is further configured to acquire information related to longitudinal acceleration and deceleration of the vehicle 10. The electrically powered suspension system 11 further includes a target pitch angle derivation part 61 configured to derive a target pitch angle of the vehicle 10 on the basis of the information related to the longitudinal acceleration and the deceleration of the vehicle 10. As the information related to longitudinal acceleration and deceleration of the vehicle 10, information on the accelerator operation amount and brake operation amount of the vehicle 10 may be utilized as appropriate.

The target load calculation part 43 is further configured to calculate a third target load related to pitch generation control based on the target pitch angle $\theta_p$ derived by the target pitch angle derivation part 61 and to calculate a combined target load into which the first target load, the second target load, and the third target load have been combined. The load control part 45 performs load control of the electromagnetic actuator 13 using the combined target load.

Now, consider a case in which sporty driving is performed on a vehicle 10 in which skyhook control and preview control are implemented. In such a case, a control device operates so as to restrain the pitching behavior (nosediving behavior) that would normally occur when braking the vehicle 10. Then, when performing a brake operation in a sporty driving situation, the driver cannot utilize the tack-in phenomenon due to the pitching behavior (nosediving behavior) to switch the advancing direction of the vehicle 10 quickly. Therefore, the sense of unity of human and automobile in sporty driving is decreased. As a result, there is a risk that the driver may feel uncomfortable.

In view of this, in the electrically powered suspension system 11 according to the first aspect, the target load calculation part 43 is further configured to calculate a third target load related to pitch generation control based on the target pitch angle $\theta_p$ derived by the target pitch angle derivation part 61 and to calculate a combined target load into which the first target load, the second target load, and the third target load have been combined; and the load control part 45 performs load control of the electromagnetic actuator 13 using the combined target load.

With the electrically powered suspension system 11 according to the first aspect, the combined target load is calculated by combining the third target load related to the pitch generation control in addition to the first target load related to the skyhook control and the second target load related to the preview control, and this combined target load is used to perform load control of the electromagnetic actuator 13. As a result, it is possible to produce a good ride quality with a sense of unity of human and automobile even when performing a brake operation in sporty driving.

Moreover, with the electrically powered suspension system 11 according to the first aspect, as the pitching behavior control of the vehicle 10 is restrained in a situation where a pitching behavior occurs in the vehicle 10 as in the case of performing a brake operation in sporty driving, the power consumption can be reduced by the amount by which the pitching behavior control is restrained. As a result, the effect of protecting the vehicle-mounted battery from heat generation and extending the life of the vehicle-mounted battery can be expected as a secondary effect.

An electrically powered suspension system 11 according to a second aspect is the electrically powered suspension system 11 according to the first aspect, wherein the electrically powered suspension system 11 may further include a sprung state amount correction part (first subtractor part 65) configured to correct the sprung state amount (sprung speed) by subtracting, from the sprung state amount, a pitch angle speed component based on the target pitch angle $\theta_p$, and the target load calculation part 43 may calculate the first target load related to skyhook control on the basis of the sprung state amount after correction.

Regarding the sprung state amount (sprung speed), the sprung state amount correction part (first subtractor part 65) of the electrically powered suspension system 11 according to the second aspect performs correction to remove a pitch angle speed component from the current sprung speed by subtracting a pitch angle speed component based on the target pitch angle $\theta_p$ from the sprung speed, which is the sprung state amount acquired by the information acquisition part 41.

In short, as the target pitch angle speed component is removed from the basic data (sprung speed) for obtaining the first target load related to skyhook control, the influence of the target pitch angle $\theta_p$ to the skyhook control can be removed.

As the electrically powered suspension system 11 according to the second aspect performs correction to remove the pitch angle component from the current sprung speed by subtracting the pitch angle speed component based on the target pitch angle $\theta_p$ from the sprung speed, which is the sprung state amount, it is possible to avoid competition of a skyhook control operation and a pitch generation control operation which originate from the same pitch angle speed component compared to the electrically powered suspension system 11 according to the first aspect. As a result, it is possible to reduce an error in the combined target load to perform high-precision load control.

An electrically powered suspension system 11 according to a third aspect is the electrically powered suspension system 11 according to the first or second aspect, wherein the target pitch angle derivation part 61 (see FIG. 4) may be configured to derive a target pitch angle $\theta_p$ using an equation of motion of a pitch action (see formula (1)), the equation of motion including a damping coefficient Cs of a virtual damper 87 (see FIG. 5A) provided between the vehicle body (sprung member) and a wheel (unsprung member) of the vehicle 10, and wherein the damping coefficient Cs of the virtual damper 87 may be set to a value according to a preference of a user regarding the pitching behavior of the vehicle 10.

According to the electrically powered suspension system 11 according to the third aspect, the target pitch angle derivation part 61 is configured to derive a target pitch angle $\theta_p$ using an equation of motion of a pitch action, the equation of motion including a damping coefficient Cs of the virtual damper 87 provided between the vehicle body (sprung member) and a wheel (unsprung member) of the vehicle 10, and the damping coefficient Cs of the virtual damper 87 is set to a value according to a preference of a user regarding the pitching behavior of the vehicle 10. As a result, it is possible to produce a good ride quality with a better sense of unity of human and automobile compared to the electrically powered suspension system 11 according to the first or second aspect.

[Other Modifications]

The plurality of embodiments described above represent examples of embodying the present invention. Therefore, the technical scope of the present invention should not be construed to be limited to these embodiments. The present invention can be implemented in various embodiments without departing from the gist or the main scope of the present invention.

For example, the electrically powered suspension systems 11 according to the embodiments of the present invention have been described with an exemplary embodiment in which a total of four electromagnetic actuators 13 are arranged for both the front wheels (front left wheel and front right wheel) and the rear wheels (rear left wheel and rear right wheel). However, the present invention is not limited to this configuration. A total of two electromagnetic actuators 13 may be arranged in either the front wheels or the rear wheels.

In addition, the electrically powered suspension systems 11 according to the embodiments of the present invention have been described such that a load control part 45 performs load control on each of a plurality of electromagnetic actuators 13 separately. Specifically, the load control part 45 is configured to perform load control on each of electromagnetic actuators 13 provided respectively on the four wheels, separately.

Alternatively, the load control part 45 may be configured to perform load control of electromagnetic actuators 13 provided respectively on the four wheels, separately for the front wheels and for the rear wheels, or separately for the right wheels and the left wheels.

The electrically powered suspension systems 11 according to the exemplary embodiments of the present invention have been described with application to a vehicle performing a brake operation in sporty driving. However, the present invention is not limited thereto. The present invention may be applied to a vehicle performing a brake operation in normal driving.

Lastly, although the electrically powered suspension systems 11 according to the exemplary embodiments of the present invention have been described with the electromagnetic actuator 13 having a ball screw type actuator as the drive mechanism, the present invention is not limited thereto.

The drive mechanism of the electromagnetic actuator 13 may be of any type, non-limiting examples of which include the linear motor type, the rack and pinion type, and the rotary type.

What is claimed is:

1. An electrically powered suspension system comprising:
   an actuator provided between a vehicle body and a wheel of a vehicle and configured to generate a load for damping vibration of the vehicle body;
   an information acquisition part configured to acquire information on a sprung state amount of the vehicle and information on a road surface state of a road on which the vehicle is traveling;

a target load calculation part configured to calculate a first target load related to skyhook control based on the sprung state amount and to calculate a second target load related to preview control based on the road surface state of the road on which the vehicle is traveling; and a load control part configured to perform load control of the actuator using calculation results of the target load calculation part, wherein the information acquisition part is further configured to acquire information related to longitudinal acceleration and deceleration of the vehicle, wherein the electrically powered suspension system further comprises a target pitch angle derivation part configured to derive a target pitch angle of the vehicle on the basis of the information related to the longitudinal acceleration and the deceleration of the vehicle, wherein the target load calculation part is further configured to calculate a third target load related to pitch generation control based on the target pitch angle derived by the target pitch angle derivation part and to calculate a combined target load into which the first target load, the second target load, and the third target load have been combined, wherein the load control part performs load control of the actuator using the combined target load, wherein the sprung state amount is a sprung speed, wherein the electrically powered suspension system further includes a sprung state amount correction part configured to correct the sprung state amount by subtracting, from the sprung speed, a pitch angle speed component based on the target pitch angle, and wherein the target load calculation part is configured to calculate the first target load related to skyhook control on the basis of the sprung state amount after correction.

2. An electrically powered suspension system comprising:

an actuator provided between a vehicle body and a wheel of a vehicle and configured to generate a load for damping vibration of the vehicle body;

an information acquisition part configured to acquire information on a sprung state amount of the vehicle and information on a road surface state of a road on which the vehicle is traveling;

a target load calculation part configured to calculate a first target load related to skyhook control based on the sprung state amount and to calculate a second target load related to preview control based on the road surface state of the road on which the vehicle is traveling; and a load control part configured to perform load control of the actuator using calculation results of the target load calculation part, wherein the information acquisition part is further configured to acquire information related to longitudinal acceleration and deceleration of the vehicle, wherein the electrically powered suspension system further comprises a target pitch angle derivation part configured to derive a target pitch angle of the vehicle on the basis of the information related to the longitudinal acceleration and the deceleration of the vehicle, wherein the target load calculation part is further configured to calculate a third target load related to pitch generation control based on the target pitch angle derived by the target pitch angle derivation part and to calculate a combined target load into which the first target load, the second target load, and the third target load have been combined, wherein the load control part performs load control of the actuator using the combined target load, wherein the target pitch angle derivation part is configured to derive the target pitch angle using an equation of motion of a pitch action, the equation of motion including a damping coefficient of a virtual damper provided between the vehicle body and a wheel of the vehicle, and wherein the damping coefficient of the virtual damper is set to a value according to a preference of a user regarding a pitching behavior of the vehicle.

3. The electrically powered suspension system according to claim 1, wherein the target pitch angle derivation part is configured to derive the target pitch angle using an equation of motion of a pitch action, the equation of motion including a damping coefficient of a virtual damper provided between the vehicle body and a wheel of the vehicle, and wherein the damping coefficient of the virtual damper is set to a value according to a preference of a user regarding a pitching behavior of the vehicle.

* * * * *